Patented Feb. 4, 1930

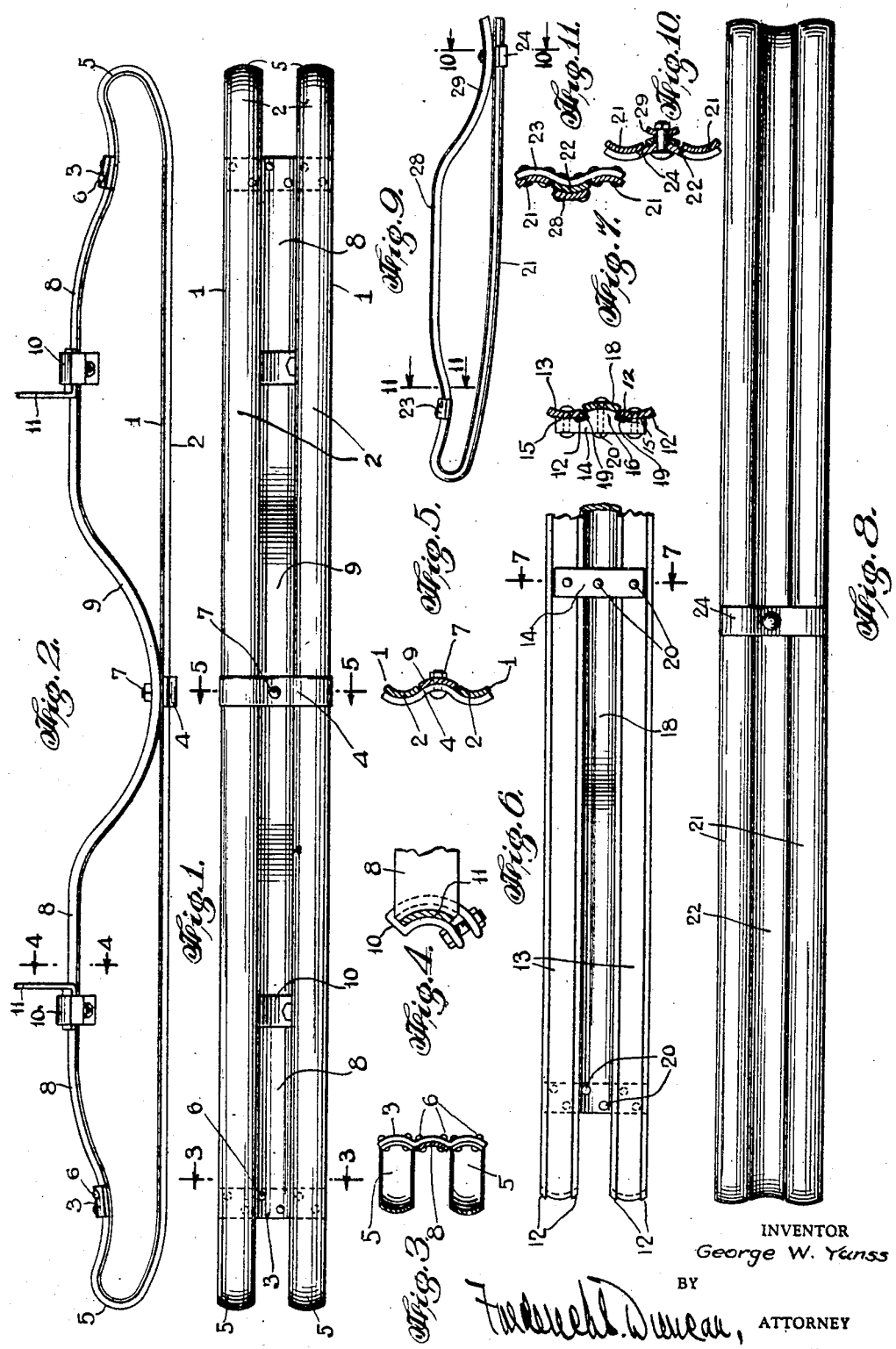

1,745,967

UNITED STATES PATENT OFFICE

GEORGE W. YANSS, OF ADRIAN, MICHIGAN, ASSIGNOR TO AMERICAN CHAIN COMPANY, INC., A CORPORATION OF NEW YORK

AUTOMOBILE BUMPER

Application filed September 21, 1927. Serial No. 220,918.

This invention relates to automobile bumpers and has for an object to provide a parallel bar bumper in which certain of the component bars are each formed of a strip with a forwardly convex impact surface of sufficient extent to afford the appearance of a complete tubular member, and which are provided with connecting means and means for attachment of the plural bar bumper to an automobile.

Still another object of the invention is to provide a plural bar bumper comprising spaced strips having forwardly convex impact surfaces, in combination with an intermediate strip of forwardly concave surface, the latter having a portion extended into the impact region and preferably combined with the main impact bars to constitute an impact surface of ogee contour. In a now-preferred form of this embodiment of the invention, the intermediate bar has its impact portion substantially co-extensive with the adjacent impact surfaces of the main bars, and the combined bars present an uninterrupted appearance yielding the effect of a broad continuous bar, or impact section, of compound ogee form.

Plural bar bumpers of any of the above types may be provided, as a further feature of the invention, with longitudinal ribs, and such ribs may be formed along one or more of the adjacent margins of the component bars, and may be so formed as to mask the lengthwise joints therebetween.

The invention also provides novel fittings suitable for connecting and supporting plural bar bumpers of the type herein disclosed, these fittings being specially devised to hold the members rigidly in assembled relation.

The above and other features of the invention are illustrated and described fully in the accompanying drawings and specification and are pointed out in the claims.

In the drawings,—

Fig. 1 is a view in front elevation of a bumper embodying the invention.

Fig. 2 is a plan view of the bumper of Fig. 1.

Fig. 3 is a vertical section on the line 3—3 of Fig. 1.

Fig. 4 is a vertical section on the line 4—4 of Fig. 2.

Fig. 5 is a vertical section on the line 5—5 of Fig. 1.

Fig. 6 is a view similar to Fig. 1 of a modification.

Fig. 7 is a sectional view on the line 7—7 of Fig. 6.

Fig. 8 is an elevation of a modified form of parallel bar bumper embodying the invention.

Fig. 9 is a fragmentary plan view of the same.

Fig. 10 is a sectional view on the line 10—10 of Fig. 9.

Fig. 11 is a sectional view on the line 11—11.

In pursuance of the primary object of the invention, there is illustrated in Figs. 1 to 5 a now preferred form of automobile bumper in which parallel component impact bars 1 are provided, each having forwardly convex impact surfaces 2 of less than 180° in extent, but of sufficient breadth and curvature to afford the appearance respectively of complete tubular impact members, when viewed by an observer in positions ordinarily occupied in the vicinity of the bumper. Such impact members are disclosed in my co-pending application Ser. No. 220,917, and are claimed generically therein. They may desirably be formed by rolling steel strips of concavo-convex cross-section, as shown in Fig. 3, and the component bars may be supported in suitable spaced relation by connecting means such as the cross-ties 3 and 4, the ties 3 being shown as connecting loop portions 5 with which the main bars 1 may desirably be formed to carry out the desired tubular effect, while the cross-tie 4 is shown at the mid-portion of the impact section, rivets 6 being utilized to complete the connection, or bolts as at 7, or the connection may also be otherwise formed, as by welding the parts together.

Any suitable means may be provided for support of the impact bars, such for example as a rear bar or bars, as shown at 8, which supporting means in the instance illustrated is shown as also of concavo-convex section so that it may be nested against the loop ends 5 at the region of the clamps 3, and there secured by rivets 6.

The rear bar 8 shown is illustrated as having its mid-portion bent forward at 9 toward the impact region, and may desirably be connected with the mid-cross tie 4 there, as by a bolt 7.

I have provided at 10 clamps of suitable contour for securing the supporting bar 8 to attachment bars 11, these attachment bars being of well-known form adapted to be secured to the longitudinal members of an automobile frame, or to other suitable parts of the automobile structure. This connection is shown in cross-section in Fig. 4. Instead of a rear bar and attachment bars of curved contour, use may be made of a flat rear bar of conventional or any suitable form.

It will be observed that at the mid region in Fig. 5 the concave forward surface of the portion 9 of the rear bar is so related with the forwardly convex mid portions of the impact bars as to form therewith an ogee curve, as shown clearly in Fig. 5, and in pursuance of this feature another object of the present invention is to provide a plural bar bumper having an impact section comprising component bars of which certain of the bars have forwardly convex impact surfaces while an intermediate bar or a plurality of such bars may have a forwardly concave surface which may extend for any desired portion of the impact surface, and in Figs. 8 to 11 is illustrated such an assembly of convex and concave bars in which upper and lower main impact bars 21 are convex forwardly and the intermediate bar 22 fills the space therebetween and is of concave contour forwardly so that the effect produced is that of a compound ogee surface and constitutes a novel and very sightly form of bar.

Such an assembly may be so made that the compound impact structure presents the appearance of a continuous impact surface, the concavely curved portion serving to break what might otherwise be an unsightly area, as would for example be presented by a flat bar of equivalent breadth.

Accordingly, the compound impact surface may be finished smooth throughout its area and still have sufficient play of light and shade to be pleasing in appearance and easily kept polished by the user.

As a modification the component bars of either of the above types of bumper may be formed with longitudinal ribs 12 as shown in Figs. 6 and 7, such ribs being formed on any selected bar, or upon all the bars 13, and if found desirable these ribs may be formed upon the margins of one or more of the bars as indicated. When so formed upon a bumper of the type shown in Figs. 6 and 7, such ribs may serve to mask the longitudinal joint between the bars, which accordingly need not be so closely fitted, and therefore can be more readily assembled.

In Fig. 7 is shown a form of cross-tie specially devised for supporting bars of this latter structure in assembled relation. This clamp is designated by the reference character 14 and is shown as having seats at 15 for the main bars 13 and at 16 for the bar 18, the material of the clamp being grooved or relieved at 19 to receive the rib portions 12 to which reference has already been made. Rivets 20 are provided to secure the bars to the clamps, and it will be understood that in place of the rivets use may be made of bolts 7 such as that shown in Figs. 1 and 2.

I claim:

1. An automobile bumper comprising a plurality of vertically spaced impact members each extending substantially throughout the length of the impact region and formed each of a broad strip of resilient metal having a convexly curved impact surface of less than 180° in extent, but presenting when viewed from the front thereof the appearance of a cylindrical tube, said impact members being capable of bending resiliently about a vertical axis under the force of an impact, and a supporting structure connected with said impact bars and adapted to be attached to an automobile.

2. An automobile bumper comprising a plurality of impact members formed each of a broad strip of resilient metal having a convexly curved impact surface presenting the appearance of a cylindrical tube, and a supporting bar connected with said impact bars and adapted to be attached to an automobile, said supporting bar being formed of a concavo-convex strip having a portion of forwardly concave contour extended into the impact region.

3. An automobile bumper comprising in combination an impact bar having an approximately cylindrical impact surface, and an impact bar having a concave impact surface, said members being assembled in parallel relation to present an ogee impact surface.

4. An automobile bumper comprising an impact section presenting an impact surface of ogee contour.

5. An automobile bumper comprising an impact section presenting an impact surface of compound ogee contour.

6. An automobile bumper comprising an impact section presenting an impact surface of compound ogee contour, said bumper including a plurality of members each having an approximately cylindrical impact surface, and an intermediate member having a concave impact surface.

7. An automobile bumper comprising an impact section presenting an impact surface of compound ogee contour, said bumper including a plurality of members each having an approximately cylindrical impact surface, and an intermediate member having a concave impact surface, certain of said members having one or more marginal ribs.

8. An automobile bumper comprising an impact section presenting an impact surface of compound ogee contour, said bumper including a plurality of members each having an approximately cylindrical impact surface, and an intermediate member having a concave impact surface, certain of said members having one or more marginal ribs arranged to mask the longitudinal joints between said members.

9. A parallel bar bumper having plural component bars assembled with their adjacent margins arranged throughout their length to present the appearance of a continuous impact surface.

10. An automobile bumper comprising an impact section presenting an impact surface of compound ogee contour, said bumper including a plurality of members each having an approximately cylindrical impact surface, and an intermediate member having a concave impact surface, certain of said members having one or more marginal ribs arranged to mask the longitudinal joint between said members, the ends of said members being formed into loops, and a cross-tie connecting adjacent loop-ends, said cross-tie having seats for said bumper members and intervening recesses for said ribs.

11. An automobile bumper comprising a plurality of members each having an approximately cylindrical impact surface, and an intermediate member having a concave impact surface, certain of said members having one or more marginal ribs arranged to mask the longitudinal joint between said members, and a cross-tie connecting said members, said cross-tie having seats for said bumper members and intervening recesses for said ribs.

In testimony whereof, I have signed this specification.

GEORGE W. YANSS.